US009969282B2

(12) United States Patent
van Boheemen et al.

(10) Patent No.: US 9,969,282 B2
(45) Date of Patent: May 15, 2018

(54) SYSTEMS AND METHODS FOR THERMAL MANAGEMENT IN WIRELESS POWER TRANSFER

(71) Applicant: QUALCOMM Incorporated, San Diego, CA (US)

(72) Inventors: Edward van Boheemen, Munich (DE); Simon Islinger, Munich (DE); Felix Weidner, Munich (DE); Michael Werner, Markt Schwaben (DE)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 15/081,540

(22) Filed: Mar. 25, 2016

(65) Prior Publication Data

US 2017/0274778 A1    Sep. 28, 2017

(51) Int. Cl.
*B60L 11/18* (2006.01)
*H02J 50/10* (2016.01)
*H02J 7/02* (2016.01)

(52) U.S. Cl.
CPC ......... *B60L 11/182* (2013.01); *B60L 11/1829* (2013.01); *B60L 11/1833* (2013.01); *H02J 7/025* (2013.01); *H02J 7/027* (2013.01); *H02J 50/10* (2016.02); *B60L 2230/10* (2013.01)

(58) Field of Classification Search
CPC ................ B60L 11/182; B60L 11/1829; B60L 11/1833; B60L 2230/10; H02J 7/025; H02J 50/10; H02J 7/027
USPC ......................................................... 320/108
See application file for complete search history.

(56) References Cited

U.S. PATENT DOCUMENTS

| 3,260,979 | A | * | 7/1966 | Leavitt et al. | ......... | G08C 17/04 336/178 |
| 6,008,622 | A | * | 12/1999 | Nakawatase | ............ | H01F 38/14 320/108 |
| 9,711,995 | B2 | * | 7/2017 | Yuasa | ..................... | H02J 7/025 |
| 2014/0253025 | A1 | * | 9/2014 | Van Wiemeersch et al. | ....................... | H02J 7/025 320/108 |

(Continued)

FOREIGN PATENT DOCUMENTS

| EP | 2667390 A1 | 11/2013 |
| GB | 2529630 A | 3/2016 |

OTHER PUBLICATIONS

International Search Report and Written Opinion—PCT/US2017/018154—ISA/EPO—dated May 24, 2017.

(Continued)

*Primary Examiner* — Sun Lin
(74) *Attorney, Agent, or Firm* — Knobbe, Martens, Olson & Bear, LLP

(57) ABSTRACT

Invention described herein relates to wireless power transfer systems and methods that efficiently and safely transfer power to electronic devices. In an aspect of the invention, an apparatus for wirelessly receiving power is provided. The apparatus comprises a receiver circuit comprising a receiver coil configured to receive wireless power from a wireless power transmitter via a magnetic field sufficient to charge or power a load of the apparatus. The receiver circuit further comprises a ferrite material having a first side coupled to the receiver coil. The apparatus further comprises a first heat exchanger coupled to a second side of the ferrite material.

29 Claims, 9 Drawing Sheets

(56) References Cited

U.S. PATENT DOCUMENTS

| | | | |
|---|---|---|---|
| 2014/0346886 A1* | 11/2014 | Yang et al. | G06K 19/07779 |
| | | | 307/104 |
| 2015/0197155 A1 | 7/2015 | Lu et al. | |
| 2015/0255993 A1 | 9/2015 | Kuerschner et al. | |
| 2015/0326055 A1* | 11/2015 | Koyanagi et al. | H04B 5/0037 |
| | | | 455/573 |
| 2015/0364924 A1* | 12/2015 | Yuasa | H01F 27/02 |
| | | | 307/104 |
| 2017/0129344 A1* | 5/2017 | Islinger et al. | B60L 11/182 |

OTHER PUBLICATIONS

Fujita I., et al., "A 10kW Transformer with a Novel Cooling Structure of a Contactless Power Transfer System for Electric Vehicles," IEEE Energy Conversion Congress and Exposition (ECCE), 2013, pp. 3643-3650.

Lin F.Y., et al., "Reducing Leakage Flux in IPT Systems by Modifying Pad Ferrite Structures," IEEE Energy Conversion Congress and Exposition (ECCE), 2014, pp. 1770-1777.

Zhang W., et al., "Loosely Coupled Transformer Structure and Interoperability Study for EV Wireless Charging Systems," IEEE Transactions on Power Electronics, Nov. 2015, vol. 30 (11), pp. 6356-6367.

* cited by examiner

US 9,969,282 B2

SYSTEMS AND METHODS FOR THERMAL MANAGEMENT IN WIRELESS POWER TRANSFER

TECHNICAL FIELD

This application is generally related to wireless power transfer, and in particular, thermal management of wireless power devices such as electric vehicles during wireless power transfer.

BACKGROUND

Chargeable systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. It is desirable to provide wireless power transfer systems that are capable of transferring power in free space (e.g., via a wireless field) to be used to charge the electric vehicle to overcome some of the deficiencies of wired charging solutions.

SUMMARY

The systems, methods, and devices of the invention each have several aspects, no single one of which is solely responsible for its desirable attributes. The implementations disclosed herein each have several innovative aspects, no single one of which is solely responsible for the desirable attributes of the invention. Without limiting the scope of this invention as expressed by the claims which follow, some features will now be discussed briefly. After considering this discussion, and particularly after reading the section entitled "Detailed Description," one will understand how the features of the various implementations of this invention provide advantages that include improved wireless charging between wireless power transmitting units and wireless power receiving units.

In an aspect of the disclosure, an apparatus for wirelessly receiving power is provided. The apparatus may comprise a receiver circuit comprising a receiver coil configured to receive wireless power from a wireless power transmitter via a magnetic field sufficient to charge or power a load of the apparatus. The receiver circuit further comprising a ferrite material having a first side coupled to the receiver coil. The apparatus may further comprise a first heat exchanger coupled to a second side of the ferrite material.

In another aspect of the disclosure, a method for wirelessly receiving power is provided. The method includes receiving, via a receiver circuit, wireless power via a magnetic field generated by a wireless power transmitter. The wireless power received at a level sufficient to charge or power a wireless power receiver. The receiver circuit comprising a receiver coil and a ferrite material having a first side coupled to the receiver coil.

In another aspect of the disclosure, an apparatus for wirelessly receiving power is provided. The apparatus comprises means for receiving wireless power from a wireless power transmitter via a magnetic field sufficient to charge or power a load of the apparatus. The apparatus further comprises a ferrite material having a first side coupled to the means for receiving. The apparatus further comprises means for cooling the receiving means coupled to a second side of the ferrite material.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

Figure 1:
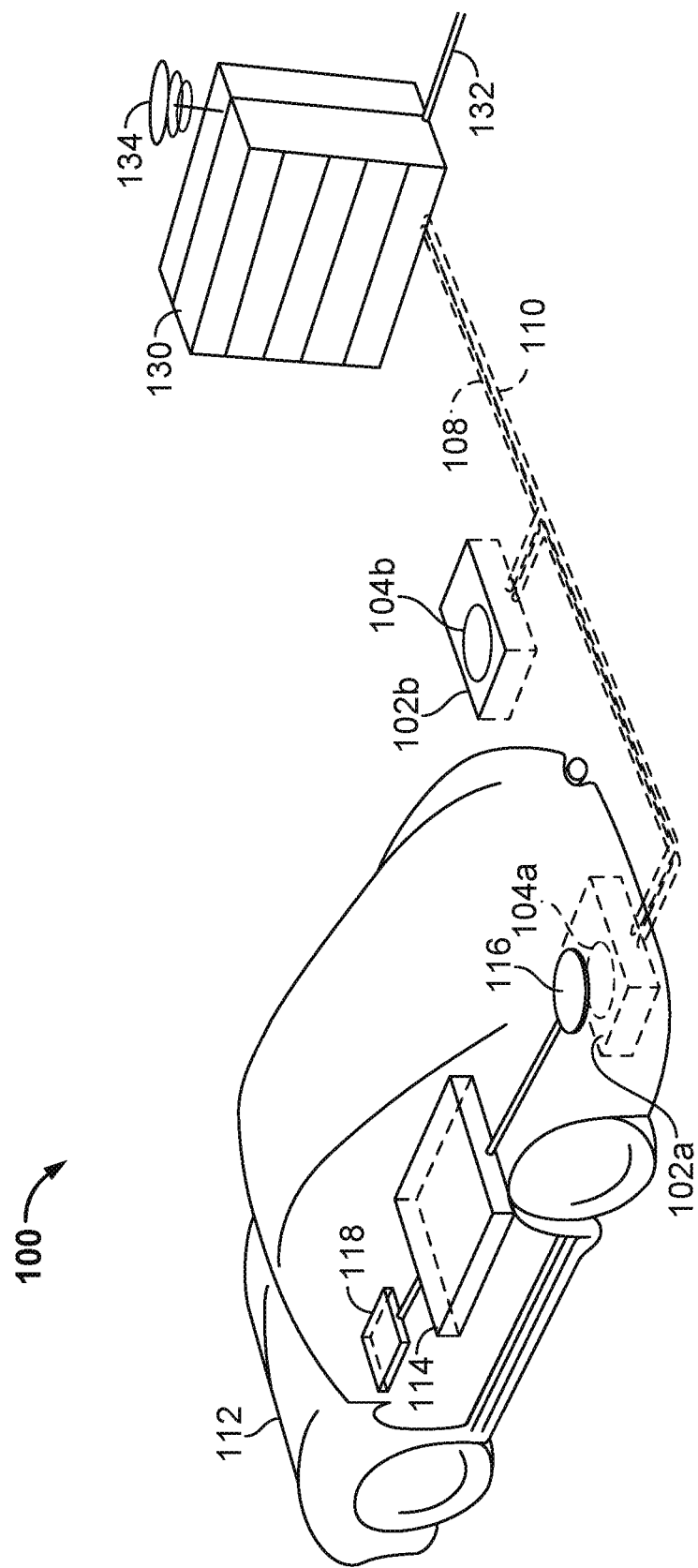
FIG. 1 is a functional block diagram of a wireless power transfer system, in accordance with one example of an implementation.

In the following detailed description, reference is made to the accompanying drawings, which form a part of the present disclosure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive antenna" to achieve power transfer.

The terminology used herein is for the purpose of describing particular embodiments only and is not intended to be limiting of the disclosure. It will be understood by those within the art that if a specific number of a claim element is intended, such intent will be explicitly recited in the claim, and in the absence of such recitation, no such intent is present. For example, as used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Electrical and electronic processes often generate waste heat. Waste heat is energy that is necessarily produced by processes requiring energy, such as electrical and electronic processes, including wired and wireless power transfer and charging operations. As generally referred to herein, waste heat may also include thermal power dissipation of one or more of the devices involved in wireless power transfer. "Waste heat" may alternatively be referred to herein as "heat power dissipation" or "thermal power dissipation." The terms may generally be used interchangeably.

Although relatively small in magnitude, waste heat in electronics may adversely affect the performance of an electronic device, e.g., a mobile device such as those described below. Increased temperatures may result in decreased efficiency of charging operations and shortened operating life of a power storage device, for example, a battery being charged, or the electronic device, for example, a mobile wireless device. Thus, efficient dissipation or disposal of waste heat in electronics may increase efficiency and operating life of the components.

In a wireless power transfer system similar to those described herein, a wireless power transmitter transfers wireless power to a wireless power receiver. In operation, the transmitter and the receiver may be in close proximity or in contact with one another in order to optimize the transfer of wireless power. In general, one or both of the transmitter and receiver may increase in temperature during the charging operations. As inductive power is transferred some of the energy is lost as waste heat. Accordingly, one or both of the transmitter and the receiver may increase in temperature during power transfer.

In some embodiments, wireless power receiver induction coils in wireless electric vehicle charging (WEVC) applications can generate significant losses in power transfer. In some aspects, due to smaller and smaller vehicle pads including the receiver induction coils, it may be difficult to get losses out of the vehicle pad/induction coil. Adding an aluminium or other metallic heatsinks for passive cooling may not be preferable since the magnetic fields would generate additional losses in the cooling components if they are in close proximity to the induction coils of the wireless power transmitter/receiver. In some aspects, forced air cooling applications may also be not preferred or available under the car, so it may not be an option. Additionally, increased temperature of the transmitter and/or receiver may lead to a reduction in charge capability. This may further result in increased charging times.

In order to increase wireless power transfer from the transmitter to the receiver, a number of thermal management solutions may be implemented. In some aspects, it may be beneficial to actively cool the vehicle pad and/or transmitter without additional loss generation. This would enable further size reduction of vehicle pads. For example, embodiments described herein relate to utilizing metallic and non-metallic active cooling methods and devices to cool wireless power receivers and/or transmitters.

FIG. 1 is a diagram of a wireless power transfer system 100 for charging an electric vehicle 112, in accordance with some implementations. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some implementations, a local distribution center 190 may be connected to a power backbone 192 and configured to provide an alternating current (AC) or a direct current (DC) supply through a power link 110 to the base wireless charging system 102a. The base wireless charging system 102a also includes a base system induction coil 104a for wirelessly transferring or receiving power. An electric vehicle 112 may include a battery unit 118, an electric vehicle induction coil 116, and an electric vehicle wireless charging system 114. The electric vehicle induction coil 116 may interact with the base system induction coil 104a for example, via a region of the magnetic field generated by the base system induction coil 104a.

In some implementations, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. For example, the energy output by the base system induction coil 104a may be at a level sufficient to charge or power the electric vehicle 112. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about $\frac{1}{2}\pi$ of wavelength of the base system induction coil 104a (and vice versa for the electric vehicle induction coil 116) as will be further described below.

Local distribution 130 may be configured to communicate with external sources 132 (e.g., a power grid) via a communication backhaul 134, and with the base wireless charging system 102a via a communication link 108.

In some implementations the electric vehicle induction coil 116 may be aligned with the base system induction coil 104a and, therefore, disposed within a near-field region simply by the driver positioning the electric vehicle 112 correctly relative to the base system induction coil 104a. In other implementations, the driver may be given visual feedback, auditory feedback, or combinations thereof to determine when the electric vehicle 112 is properly placed for wireless power transfer. In yet other implementations, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other implementations, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
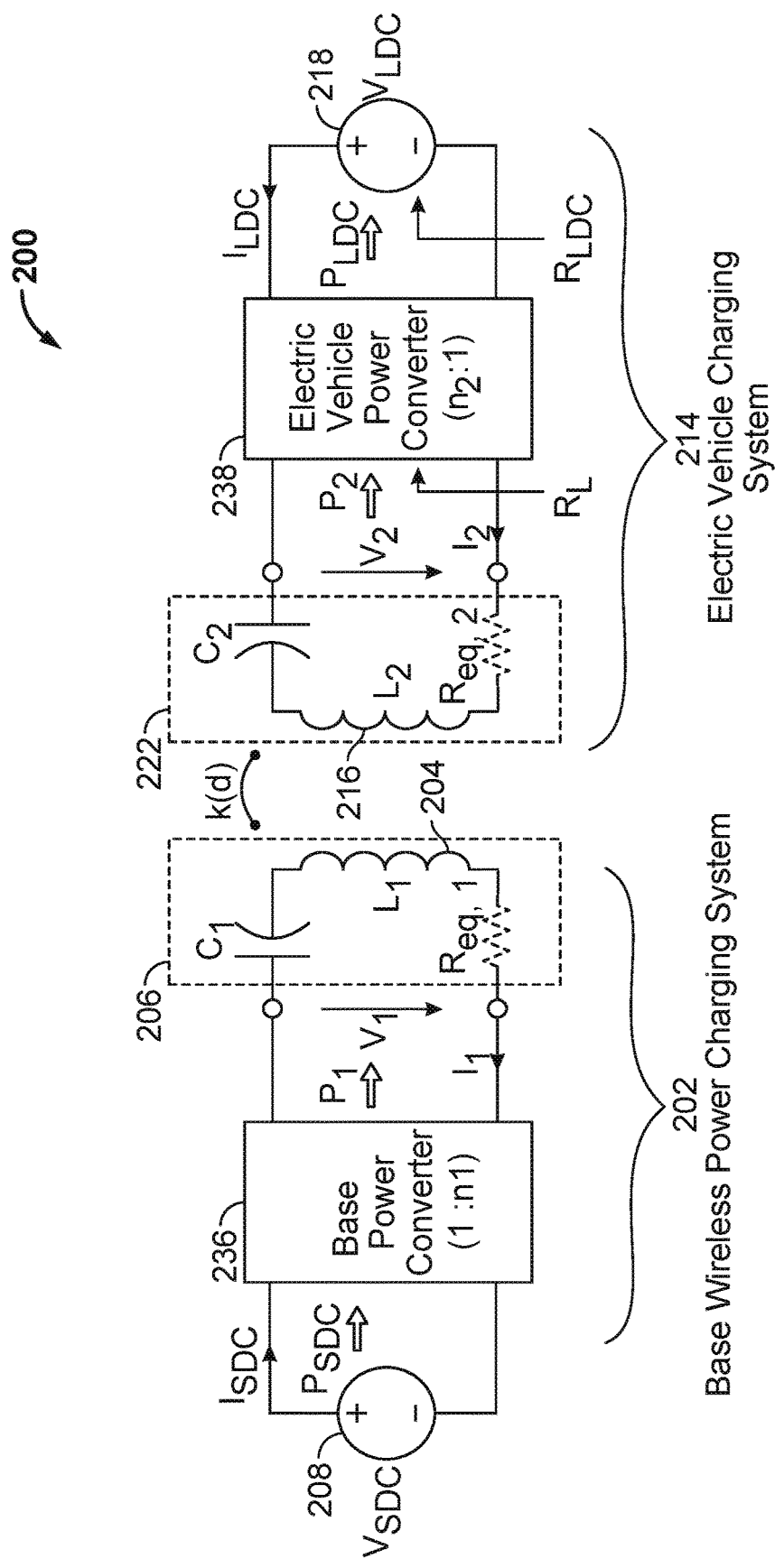
FIG. 2 is a functional block diagram of a wireless power transfer system, in accordance with another example implementation.

FIG. 2 is a schematic diagram of core components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Implementations described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless charging system 202 to transfer energy to an electric vehicle 112. The base wireless charging system 202 includes a base charging system power converter 336. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including the capacitor $C_1$ in series with the base system induction coil 204 to emit a magnetic field at a desired frequency. The capacitor $C_1$ may be coupled with the base system induction coil 204 either in parallel or in series, or may be formed of several reactive elements in any combination of parallel or series topology. The capacitor $C_1$ may be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower) and, in some implementations, may be transferred at frequencies including but not limited to 85 kHz.

The base system transmit circuit 206 including the base system induction coil 204 and electric vehicle receive circuit 222 including the electric vehicle induction coil 216 may be tuned to substantially the same frequencies and may be positioned within the near-field of a magnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including capacitor $C_2$ and electric vehicle induction coil 116. The capacitor $C_2$ may be provided to form a resonant circuit with the electric vehicle induction coil 216 that resonates at a desired frequency. The capacitor $C_2$ may be coupled with the electric vehicle induction coil 204 either in parallel or in series, or may be formed of several reactive elements in any combination of parallel or series topology. Element k(d) represents the mutual coupling coefficient resulting at coil separation. Equivalent resistances $R_{eq,1}$ and $R_{eq,2}$ represent the losses that may be inherent to the induction coils 204 and 216 and the anti-reactance capacitors $C_1$ and $C_2$. The electric vehicle receive circuit 222 including the electric vehicle induction coil 216 and capacitor $C_2$ receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to "cloak" the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some implementations, the base system induction coil 204 and electric vehicle induction coil 116 are configured according to a mutual resonant relationship such that when the resonant frequency of the electric vehicle induction coil 116 and the resonant frequency of the base system induction coil 204 are very close or substantially the same. Transmission losses between the base wireless charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in a magnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed implementations may be referred to or configured as "loop" antennas, and more specifically, multi-turn loop antennas. The induction coils 204 and 216 may also be referred to herein or be configured as "magnetic" antennas. The term "coils" is intended to refer to a component that may wirelessly output or receive energy four coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger magnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil to create a resonant structure at a desired resonant frequency. As a non-limiting example, as shown in FIG. 2, a capacitor may be added in series with the induction coil to create a resonant circuit (e.g., the base system transmit circuit 206) that generates a magnetic field. Accordingly, for larger diameter induction coils, the value of capacitance needed to induce resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high quality (Q) factor to improve the resonance of the induction coil. For example, the Q factor may be 300 or greater.

As described above, according to some implementations, coupling power between two induction coils that are in the near field of one another is disclosed. As described above, the near field may correspond to a region around the induction coil in which magnetic fields exist but may not propagate or radiate away from the induction coil. Near-field coupling-mode regions may correspond to a volume that is near the physical volume of the induction coil, typically within a small fraction of the wavelength. According to some implementations, magnetic induction coils, such as single and multi-turn loop antennas, are used for both transmitting and receiving since magnetic near field amplitudes in practical implementations tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
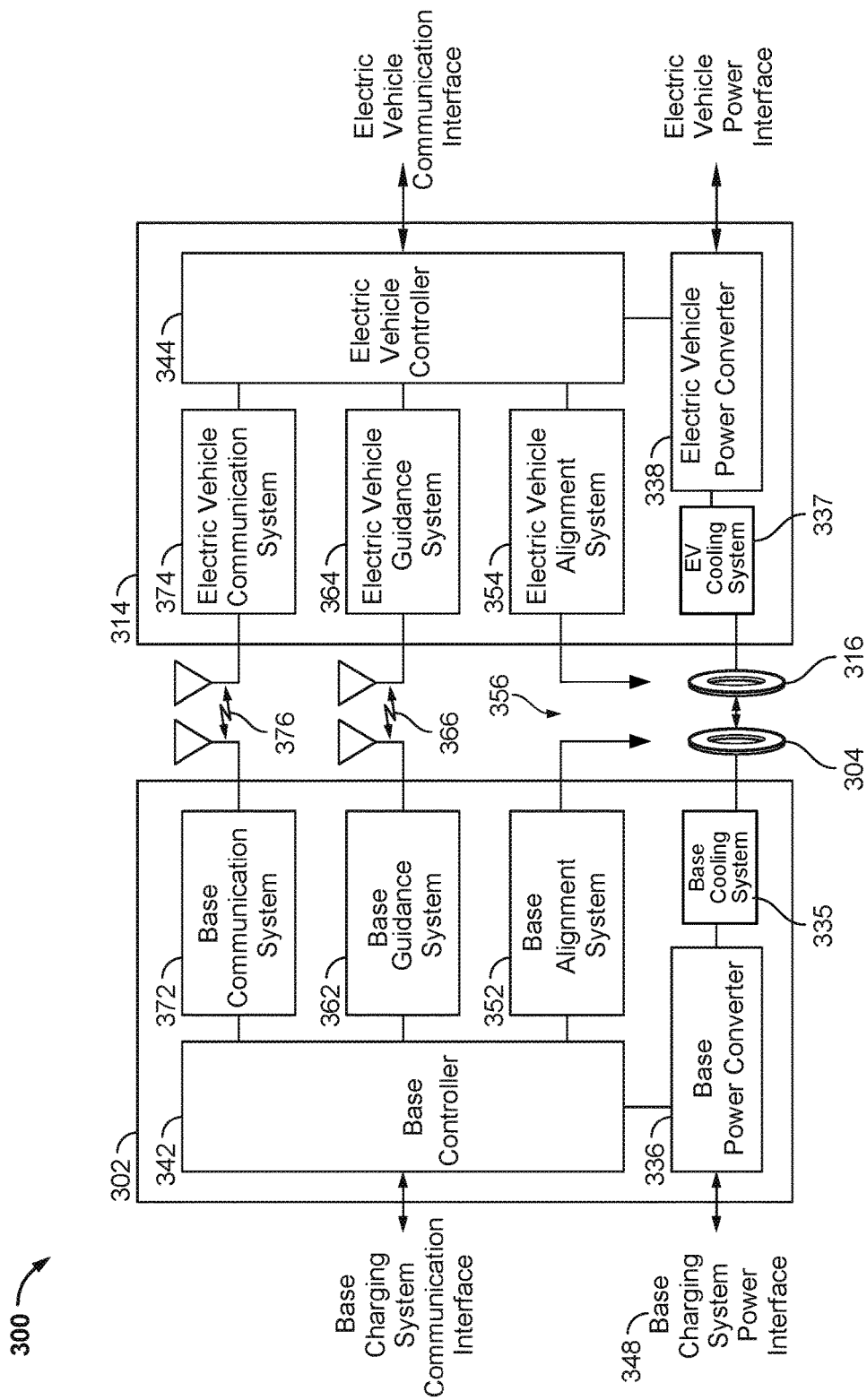
FIG. 3 is a functional block diagram of a wireless power transfer system, in accordance with another example implementation.

FIG. 3 is another functional block diagram showing core and ancillary components of the wireless power transfer system 300 of FIG. 1. The wireless power transfer system 300 illustrates a communication link 376, a guidance link 366, and an alignment mechanism 356 capable of mechanically moving one or both of the base system induction coil 304 and the electric vehicle induction coil 316 via base alignment system 352 and electric vehicle alignment systems 354. The guidance link 366 may be capable of bi-directional signaling, meaning that guidance signals may be emitted by the base guidance system 362 or the electric vehicle guidance system 364 or by both. As described above with reference to FIG. 2, and assuming energy flow towards the electric vehicle 112, in FIG. 3 a base charging system power interface 348 may be configured to provide power to a charging system power converter 336 from a power source, such as an AC or DC power supply 208. The base charging system power converter 336 may receive AC or DC power from the base charging system power interface 348 to excite the base system induction coil 304 at or near its resonant frequency. In some aspects, a base cooling system 335 may be coupled to the base system induction coil 304. In some embodiments, when the base system induction coil 304 is in operation, it may generate heat in the base system induction coil 304 or in other nearby objects and systems. The base cooling system 335 may be configured to cool the base system induction coil 304 in order to prevent overheating and/or damage of the base system induction coil 304.

The electric vehicle induction coil 316, when in the near field coupling-mode region, may receive energy from the near field coupling mode region to oscillate at or near the resonant frequency. In some aspects, an electric vehicle (EV) cooling system 337 may be coupled to the electric vehicle induction coil 316. In some embodiments, when the electric vehicle induction coil 316 is in operation and receiving power from the base system induction coil 304, it may generate heat in the electric vehicle induction coil 316 or in other nearby objects and systems of the electric vehicle. The EV cooling system 337 may be configured to cool the electric vehicle induction coil 316 in order to prevent overheating and/or damage of the electric vehicle induction coil 316. The electric vehicle power converter 338 converts the oscillating signal from the electric vehicle induction coil 316 to a power signal suitable for charging a battery via the electric vehicle power interface.

The base wireless charging system 302 includes a base charging system controller 342 and the electric vehicle charging system 314 includes an electric vehicle controller 344. The base charging system controller 342 may include a base charging system communication interface 358 to other systems (not shown) such as, for example, a computer, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 376 to provide a feedback mechanism for more closely aligning the base coupler 304 and electric vehicle coupler 316, either via autonomous, mechanical (kinematic) alignment or with operator assistance. Similarly, a base charging guidance system 362 may communicate with an electric vehicle guidance system 364 through a guidance link 366 to provide a feedback mechanism to guide an operator in aligning the base coupler 304 and electric vehicle coupler 316. In addition, there may be separate general-purpose communication links (e.g., channels) supported by base charging communication system 372 and electric vehicle communication system 374 for communicating other information between the base wireless charging system 302 and the electric vehicle charging system 314. This information may include information about electric vehicle characteristics, battery characteristics, charging status, and power capabilities of both the base wireless charging system 302 and the electric vehicle charging system 314, as well as maintenance and diagnostic data for the electric vehicle 112. These communication channels may be separate physical communication channels such as, for example, Bluetooth, ZigBee, cellular, etc.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in any of the base wireless charging system 102a and the electric vehicle charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 may include detection and sensor systems. For example, the wireless power transfer system 300 may include sensors for use with systems to properly guide the driver or the vehicle to the charging spot, sensors to mutually align the induction coils with the required separation/coupling, sensors to detect objects that may obstruct the electric vehicle induction coil 316 from moving to a particular height and/or position to achieve coupling, and safety sensors for use with systems to perform a reliable, damage free, and safe operation of the system. For example, a safety sensor may include a sensor for detection of presence of animals or children approaching the wireless power induction coils 104a, 116 beyond a safety radius, detection of metal objects near the base system induction coil 304 that may be heated up (induction heating), detection of hazardous events such as incandescent objects on the base system induction coil 304, and temperature monitoring of the base wireless charging system 302 and electric vehicle charging system 214 components.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 316 may also be configured to act as wireless communication transmitters. Thus, some implementations of the base wireless charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 342 for use in determining whether to enable the oscillator for transmitting energy, to communicate with an active receiver, or a combination thereof.

Figure 4A:
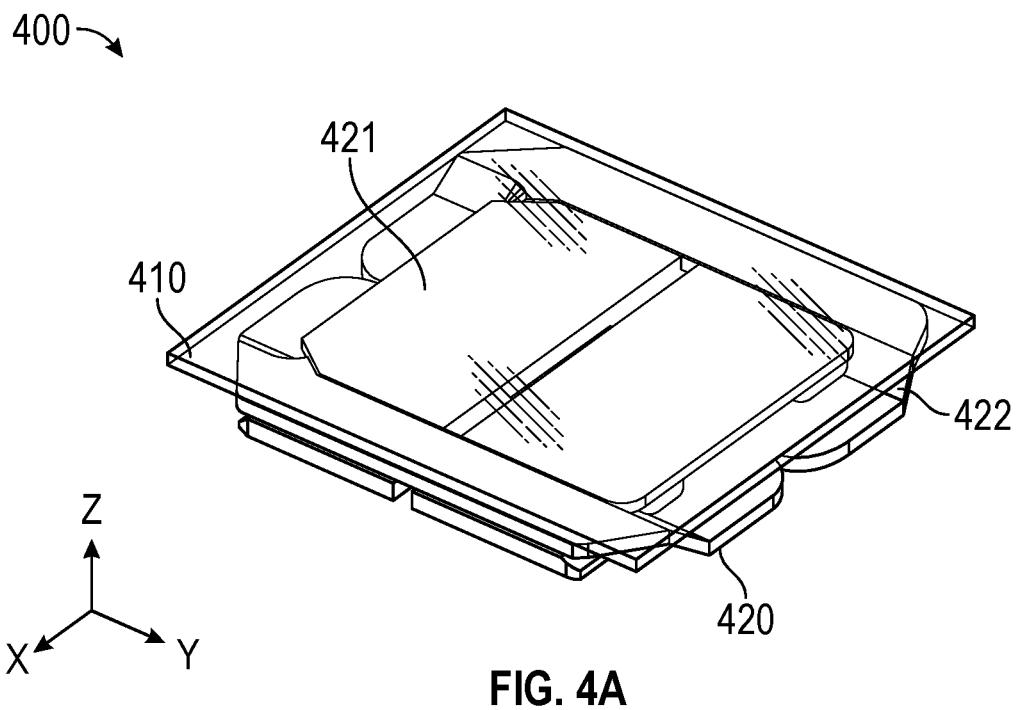
FIG. 4A is a diagram of a wireless power transfer system comprising a metallic heat sink, in accordance with another example implementation.

FIG. 4A is a diagram of an electric vehicle charging system 400 illustrating a configuration of a heat sink 410 coupled to a vehicle pad 420 in accordance with an embodiment. As shown, the vehicle pad 420 comprises a ferrite portion 421 and a coil portion 422. The vehicle pad 420 may also be referred to herein as the power receiving unit (PRU) 420. The PRU 420 may be similar to the electric vehicle charging system 114, 214, 314 (FIGS. 1-3) and the electric vehicle induction coil 116, 216, and 316 (FIGS. 1-3) and be configured to receive a wireless field from the base system induction coil 104, 204, 304 of the base wireless charging system 102, 202, and 302 (FIGS. 1-3). In some embodiments the coil/antenna portion 422 of the PRU 420 may span a majority of the dimension of the PTU 420. In some aspects, the coil portion 422 may comprise a copper coil. The heat sink 410, as shown in FIG. 4A is located in a position internal to or above the ferrite portion 421 and the coil portion 422 of the PRU 420. In some aspects, the heat sink 410 may comprise a metallic heat sink or water cooled heat exchanger. In some embodiments, the location of the metallic heat sink 410 as shown in FIG. 4A may add eddy current losses to the wireless power transfer systems 100-300 of FIGS. 1-3 due to high magnetic field exposure over the coil portion 422.

Figure 4B:
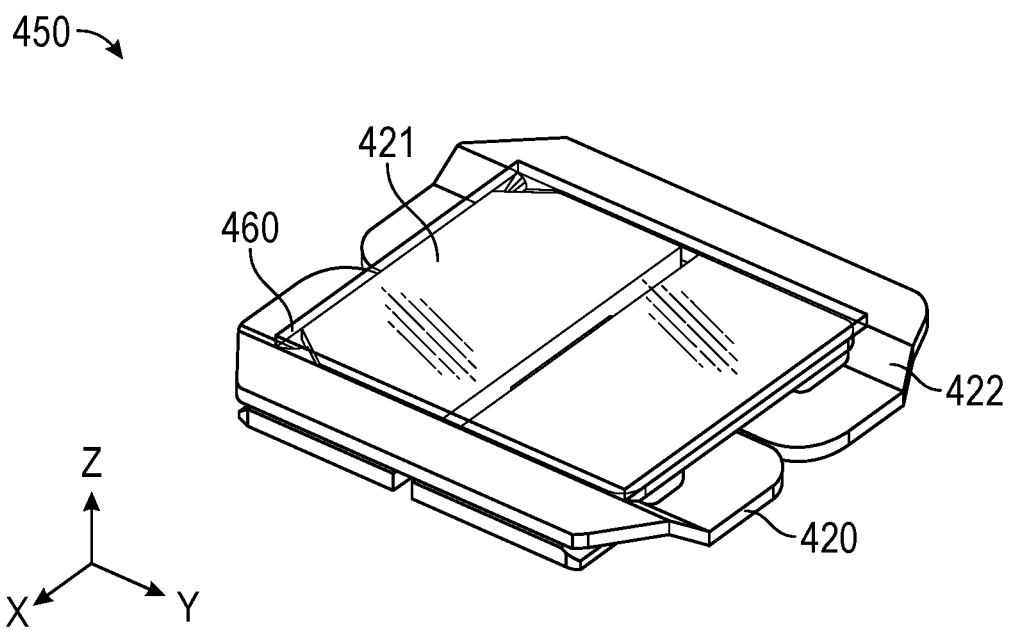
FIG. 4B is a diagram of a wireless power transfer system comprising a metallic heat sink, in accordance with another example implementation.

FIG. 4B is a diagram of an electric vehicle charging system 450 illustrating a configuration of a heat sink 460 coupled to the vehicle pad 420 in accordance with an embodiment. The electric vehicle charging system 450 is similar to and adapted from the electric vehicle charging system 400 of FIG. 4A. Only differences between the electric vehicle charging systems 400 and 450 are discussed for the sake of brevity.

As shown in FIG. 4B, the heat sink 460 is located in a position internal to or above only the ferrite portion 421. The ferrite portion 421 channels or concentrates the magnetic flux received from the base system induction coil 304 such that an area above a second side of the ferrite material 421 facing toward the interior of the electric vehicle has a reduced or minimal magnetic field. Accordingly, any metallic portions of the heat sink 460 would not be significantly influenced by the small magnetic field above the second side of the ferrite material 421 and would not generate, or would generate only minimal eddy currents. The reduced eddy currents in the metallic portions of the heat sink 460 would therefore generate fewer losses than the metallic portions of the heat sink 410 of FIG. 4A and may result in a better efficiency of the electric vehicle charging system 450 than the electric vehicle charging system 400.

Figure 5A:
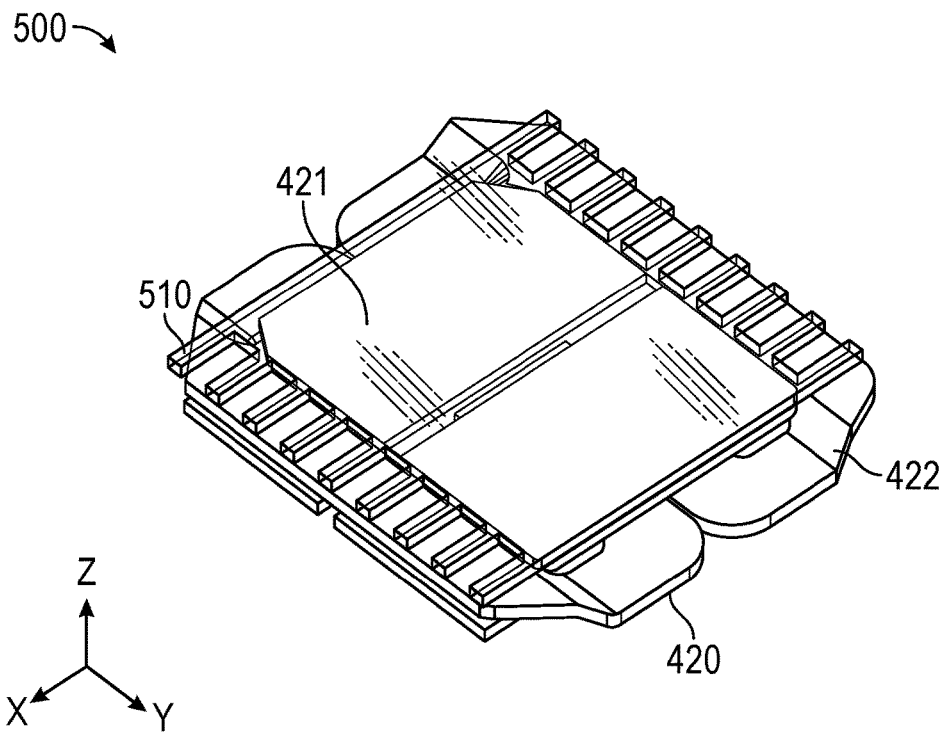
FIG. 5A is a diagram of a wireless power transfer system comprising a metallic heat sink, in accordance with another example implementation.

In some aspects, it may be desirable to have portions of a heat sink located above the coil portion 422 in order to better remove the heat generated by the coil portion 422 during wireless power transfer. FIG. 5A is a diagram of an electric vehicle charging system 500 illustrating a configuration of a heat sink 510 coupled to the vehicle pad 420 in accordance with an embodiment. The electric vehicle charging system 500 is similar to and adapted from the electric vehicle charging system 450 of FIG. 4B. Only differences between the electric vehicle charging systems 450 and 500 are discussed for the sake of brevity.

As shown in FIG. 5A, the heat sink 510 is located in a position internal to or above the ferrite portion 421. The heat sink 510 comprises metallic fins or extensions that extend over the coil portion 422. In some embodiments, the metallic extensions may comprise metallic pipes for carrying cooling liquids such as water. In some aspects, the number, size, and/or length of the extensions may be based on their ability and effectiveness at convective or conductive heat transfer in relation to any impact on the magnetic field. In some embodiments, the length of the extensions of the heat sink 510 may be such that the extensions do not affect the magnetic field generated by the base system induction coil 304. The extensions may further be arranged having a horizontal separation between individual extensions of a value such that at least one of convective/conductive heat removal, the aesthetics, and surface grip are maximized. As shown, the extensions of the heat sink 510 are configured such that they are positioned substantially parallel to the magnetic field lines of the magnetic field generated by the base system induction coil 304. As discussed above, the portions of the heat sink 510 located above the coil portion 422 may help to pull losses out from the coil portion 422 toward the center of the heat sink 510. In some aspects, the parallel configuration of the metallic extensions of the heat sink 510 helps minimize any eddy currents that would be generated in the metallic extensions. The reduced eddy currents in the metallic extensions of the heat sink 510 may therefore generate fewer losses than the metallic portions of the heat sink 410 of FIG. 4A located over coil portion 422 while still removing heat/losses from the coil portion 422. Accordingly, the use of the heat sink 510 may result in a better efficiency of the electric vehicle charging system 500 than the electric vehicle charging system 400.

Figure 5B:
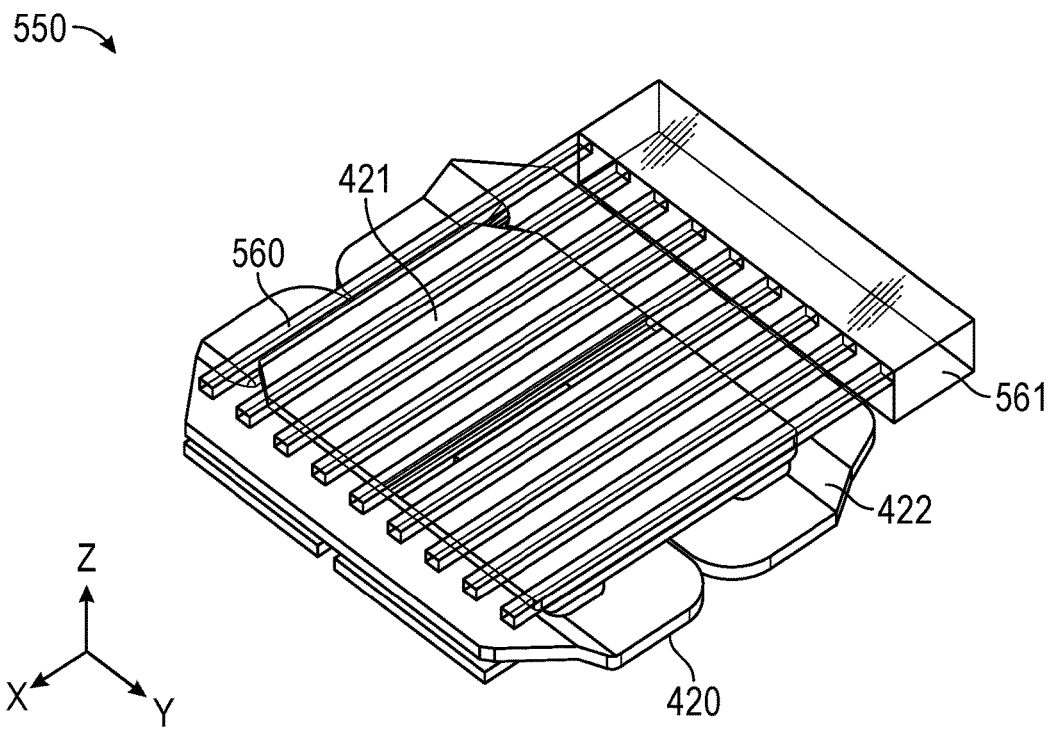
FIG. 5B is a diagram of a wireless power transfer system comprising a first metallic heat sink and a second metallic heat sink, in accordance with another example implementation.

FIG. 5B is a diagram of an electric vehicle charging system 550 illustrating a configuration of a first heat sink 560 coupled to the vehicle pad 420 and a second heat sink 561 in accordance with an embodiment. The electric vehicle charging system 550 is similar to and adapted from the electric vehicle charging system 500 of FIG. 5A. Only differences between the electric vehicle charging systems 500 and 550 are discussed for the sake of brevity.

As shown in FIG. 5B, the heat sink 560 is located in a position internal to or above the ferrite portion 421. The heat sink 560 comprises metallic fins or extensions that extend over the coil portion 422. In some aspects, the heat sink 561 may comprise a metallic cavity or tank for housing a cooling liquid. In some embodiments, the metallic extensions may comprise metallic pipes for carrying cooling liquids such as water. In some aspects, the number, size, and/or length of the extensions may be based on their ability and effectiveness at convective/conductive heat transfer in relation to any impact on the magnetic field. As shown, the extensions of the heat sink 560 are configured such that they are positioned substantially parallel to the magnetic field lines of the magnetic field generated by the base system induction coil 304. As discussed above, the portions of the heat sink 560 located above the coil portion 422 may help to pull losses out from the coil portion 422 toward the second heat sink 561. The heat sink 561 may be located in position outside an area defined by the vehicle pad 420. In some aspects, the location outside the area defined by the vehicle pad 420 may be exposed to a reduced or minimal magnetic field that is generated from the base system induction coil 304. Accordingly, the metallic portions of the heat sink 561 may have reduced eddy currents generated as a result of the magnetic field. In some aspects, the parallel configuration of the metallic extensions/pipes of the heat sink 560 helps minimize any eddy currents that would be generated in the metallic extensions. The reduced eddy currents in the metallic extensions of the heat sink 510 may therefore generate fewer losses than the metallic portions of the heat sink 410 of FIG. 4A located over coil portion 422 while still removing heat/losses from the coil portion 422. Additionally, the use of the second heat sink 561 may be located above power electronics (e.g., switch circuits, processors, memory circuits, etc.) to help remove heat generated by those power electronics. Accordingly, the use of the heat sink 510 may result in a better efficiency of the electric vehicle charging system 500 than the electric vehicle charging system 400.

In some aspects, it may be desirable to utilize non-metallic water cooling applications to minimize or eliminate eddy current losses that are generated by using metallic heat sinks or metallic liquid cooled heat exchangers. FIG. 6A is an inverted diagram of an electric vehicle charging system 600 illustrating a configuration of a heat sink 610 coupled to the vehicle pad 420 in accordance with an embodiment. For FIGS. 6A-7B, the top portion of the figures would be facing a base pad while the bottom portion would face the interior of the electric vehicle. The electric vehicle charging system 600 further comprises a potting compound 611 and a housing 615. In some aspects, the potting compound 611 may be configured to maintain the vehicle pad 420 and the heat sink 610 within the housing 615. In some embodiments, the heat sink 610 comprises a non-metallic pipe or tube used for controlling the flow of a cooling liquid running through the pipe/tube. In some aspects, the heat sink 610 may comprise a plastic, glass, fiber-glass, ceramic or other non-metallic material.

As shown in FIG. 6A, the heat sink 610 is located in a position internal to or above the ferrite portion 421. The heat sink 610 comprises a non-metallic tube that can extend over the entire vehicle pad 420 (e.g., the ferrite portion 421 and the coil portion 422) in order to extract the heat/losses generated in the vehicle pad 420. Since the heat sink 610 does not contain any metallic material, it may not produce eddy currents that could increase losses and/or reduce the efficiency of the electric vehicle charging system 600. Accordingly, the use of the heat sink 610 may result in a better efficiency of the electric vehicle charging system 600 than the electric vehicle charging system 400 of FIG. 4A.

Figure 6B:
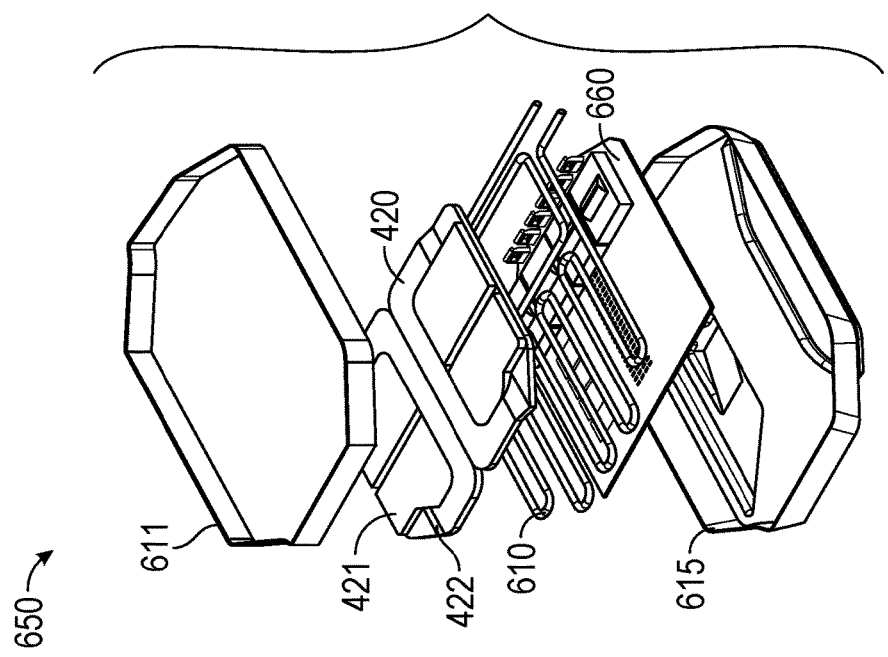
FIG. 6B is a diagram of a wireless power transfer system comprising a non-metallic heat sink and an electronic circuit, in accordance with another example implementation.
Figure 6A:
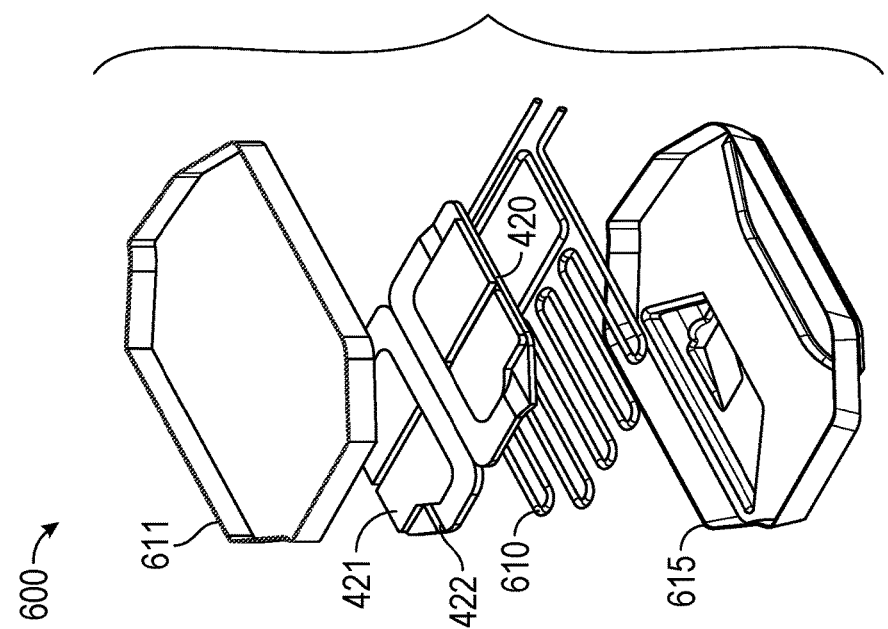
FIG. 6A is a diagram of a wireless power transfer system comprising a non-metallic heat sink, in accordance with another example implementation.

FIG. 6B is an inverted diagram of an electric vehicle charging system 650 illustrating a configuration of an electronic circuit 660 coupled to the heat sink 610 in accordance with an embodiment. The electric vehicle charging system 650 is similar to and adapted from the electric vehicle charging system 600 of FIG. 6A. Only differences between the electric vehicle charging systems 600 and 650 are discussed for the sake of brevity.

As shown in FIG. 6B, the electronic circuit 660 is located in a position internal to or above the heat sink 610. In such a configuration, the heat sink 610 may be configured to extract or reduce the heat/losses of both the vehicle pad 420 and the electronic circuit 660. In some aspects, the electronic circuit 660 comprises electrical components used for controlling, monitoring, and/or facilitating wireless power transfer.

Figure 7A:
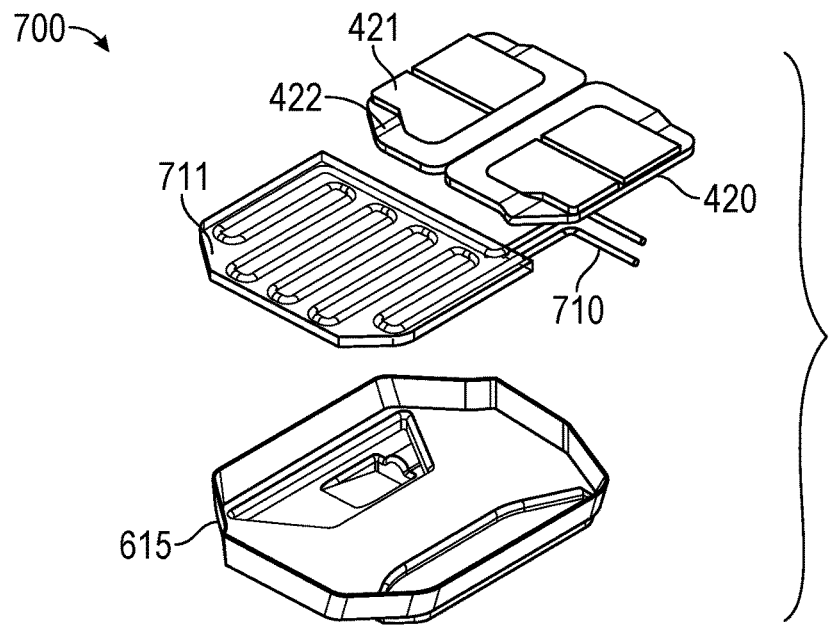
FIG. 7A is a diagram of a wireless power transfer system comprising a non-metallic heat sink and a non-metallic heat exchanger according to another exemplary embodiment.

FIG. 7A is an inverted diagram of an electric vehicle charging system 700 illustrating a configuration of a non-metallic heat exchanger 711 surrounding the non-metallic heat sink 710 in accordance with an embodiment. The electric vehicle charging system 700 is similar to and adapted from the electric vehicle charging system 600 of FIG. 6A. Only differences between the electric vehicle charging systems 600 and 700 are discussed for the sake of brevity.

As shown in FIG. 7A, the non-metallic heat exchanger 711 is located in a position internal to or above the vehicle pad 420. In some aspects, the non-metallic heat exchanger 711 surrounds the non-metallic heat sink 710. In some embodiments, the non-metallic heat exchanger 711 contains a cooling liquid inside the non-metallic heat exchanger 711. The non-metallic heat sink 710 may comprise a non-metallic tube/pipe for controlling the flow of a cooling liquid and the tube/pipe can extend over the entire vehicle pad 420 in order to extract the heat/losses generated in the vehicle pad 420. Since the heat sink 710 and the heat exchanger 711 do not contain any metallic material, they may not produce eddy currents that could increase losses and/or reduce the efficiency of the electric vehicle charging system 700. Accordingly, the use of the heat sink 710 and the heat exchanger 711 may result in a better efficiency of the electric vehicle charging system 700 than the electric vehicle charging system 400 of FIG. 4A.

Figure 7B:
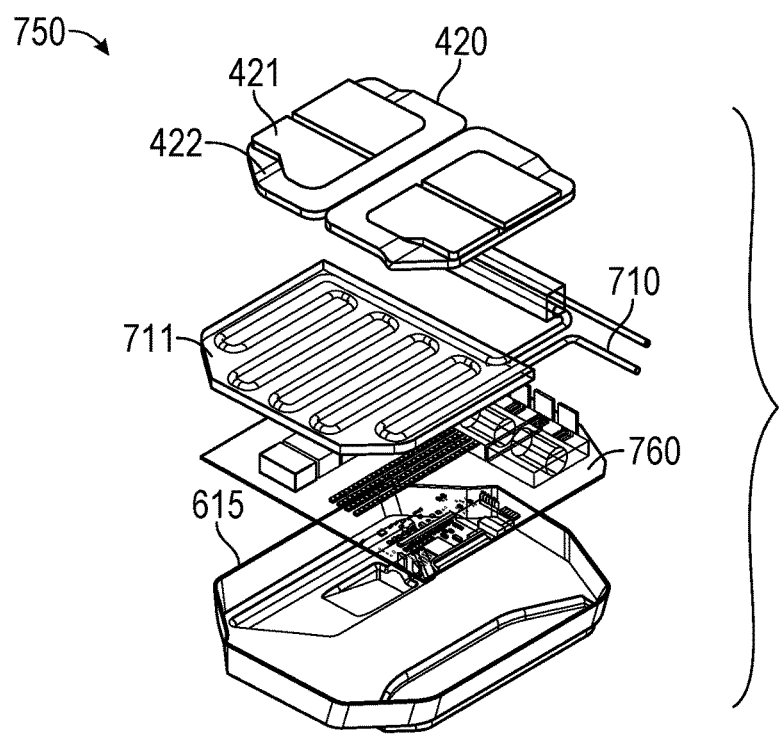
FIG. 7B is a diagram of a wireless power transfer system comprising a non-metallic heat sink, a non-metallic heat exchanger, and an electronic circuit according to another exemplary embodiment.

FIG. 7B is an inverted diagram of an electric vehicle charging system 750 illustrating a configuration of an electronic circuit 760 coupled to the heat exchanger 711 in accordance with an embodiment. The electric vehicle charging system 750 is similar to and adapted from the electric vehicle charging system 700 of FIG. 7A. Only differences between the electric vehicle charging systems 700 and 750 are discussed for the sake of brevity.

As shown in FIG. 7B, the electronic circuit 760 is located in a position internal to or above the heat exchanger 711. In such a configuration, the heat exchanger 711 and heat sink 710 may be configured to extract or reduce the heat/losses of both the vehicle pad 420 and the electronic circuit 760. In some aspects, the electronic circuit 760 comprises electrical components used for controlling, monitoring, and/or facilitating wireless power transfer.

Figure 8:
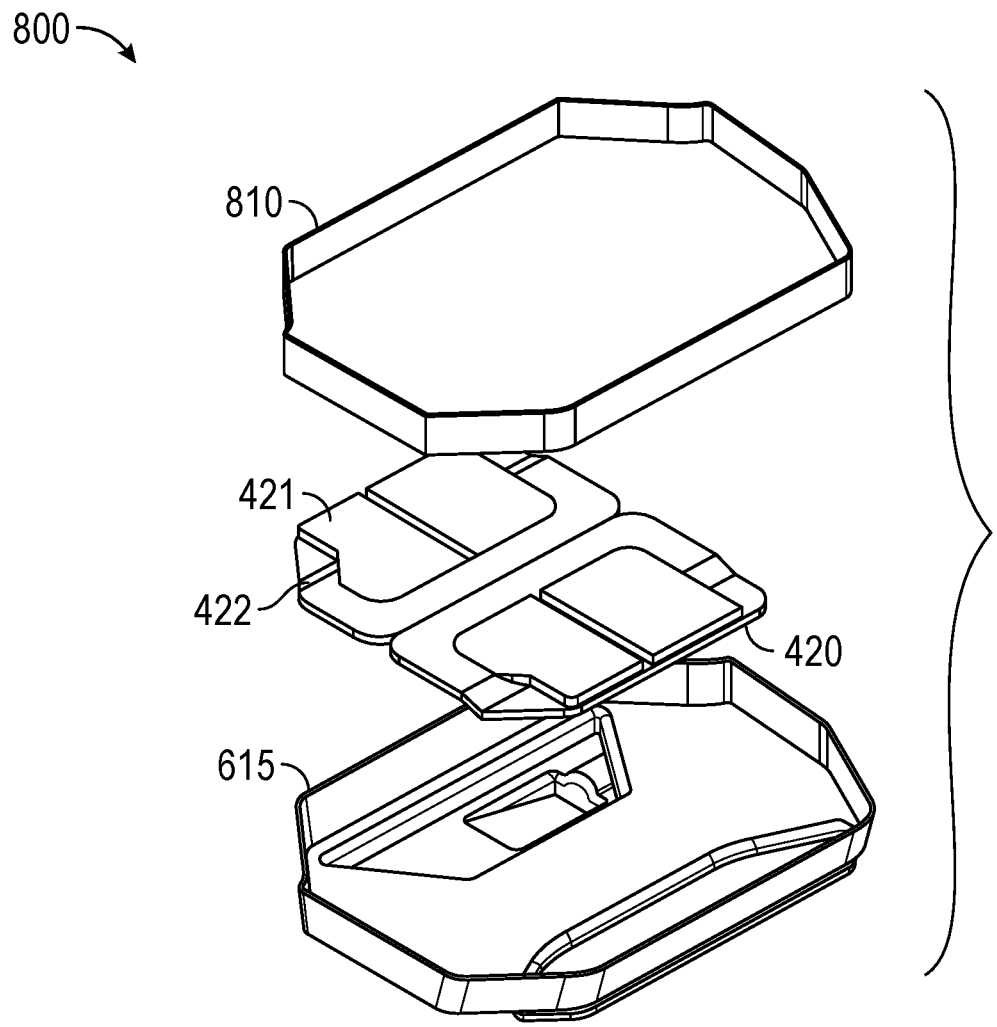
FIG. 8 is a diagram of a wireless power transfer system comprising a liquid heat sink according to another exemplary embodiment.

FIG. 8 is a diagram of an electric vehicle charging system 800 illustrating a configuration of a liquid heat sink 810 surrounding the vehicle pad 420 in accordance with an embodiment. The electric vehicle charging system 800 is similar to and adapted from the electric vehicle charging system 700 of FIG. 7A. Only differences between the electric vehicle charging systems 700 and 800 are discussed for the sake of brevity.

As shown in FIG. 8, the liquid heat sink 810 is located within the housing 615 and is allowed to flow directly around the vehicle pad 420. In some aspects, the liquid heat sink 810 comprises water or another cooling liquid. In some aspects, the liquid heat sink may be configured flow around the vehicle to extract or reduce the heat/losses of both the vehicle pad 420 and/or an electronic circuit (not shown) similar to the electronic circuit 660 and 760 of FIGS. 6B and 7B. Since the heat sink 810 does not contain any metallic material, it may not produce eddy currents that could increase losses and/or reduce the efficiency of the electric vehicle charging system 800. Accordingly, the use of the liquid heat sink 810 may result in a better efficiency of the electric vehicle charging system 800 than the electric vehicle charging system 400 of FIG. 4A.

The metallic and non-metallic heat sinks and/or heat exchangers 460, 510, 560, 610, 710, 711, and 810 of FIGS. 4B-8 may also be applicable to wireless power transmitters (e.g., base wireless charging system 102, 202, 302 of FIGS. 1-3). In addition, any combinations of any of the above metallic and non-metallic heat sinks and/or heat exchangers described above may also be possible.

Figure 9:
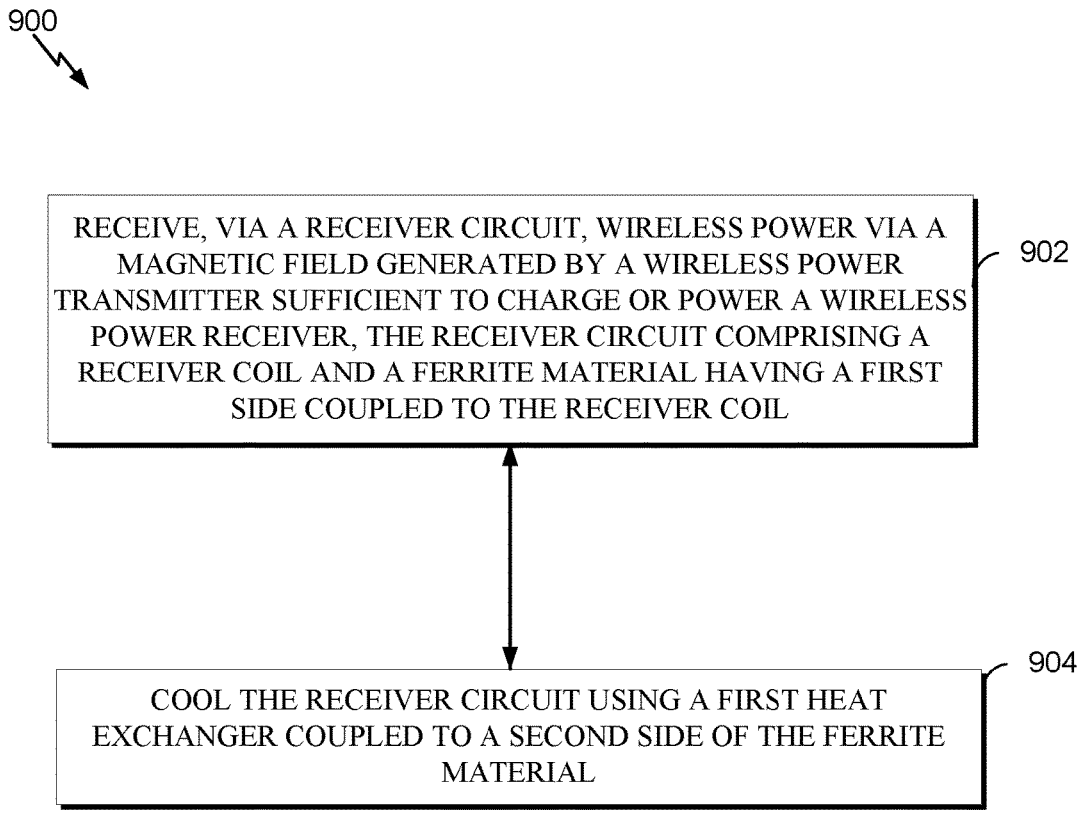
FIG. 9 is a flowchart depicting a method for managing thermal power losses according to the disclosure.

FIG. 9 is a flowchart depicting a method for managing thermal power loss according to the disclosure. The method shown in FIG. 9 may be implemented via one or more devices in the wireless power transfer systems 100-800 similar to the electric vehicle wireless charging system 114, 214, 314, the vehicle pad 420, the heat sinks and/or heat exchangers 460, 510, 560, 610, 710, 711, and 810 of FIGS. 1-8. Although the method 900 is described herein with reference to a particular order, in various implementations, blocks herein may be performed in a different order, or omitted, and additional blocks may be added.

At block 902, the electric vehicle wireless charging system (e.g., electric vehicle wireless charging system 314) receives, via a receiver circuit, wireless power via a magnetic field sufficient to power or charge a wireless power receiver. The receiver circuit comprises a receiver coil and a ferrite material having a first side coupled to the receiver coil. At block 904, the electric vehicle wireless charging system cools the receiver circuit using a first heat exchanger coupled to a second side of the ferrite material.

Another aspect of the invention includes an electric vehicle wireless charging system 314. The electric vehicle wireless charging system comprises means for receiving wireless power from a wireless power transmitter via a magnetic field sufficient to charge or power a load of the apparatus. In some embodiments, the means for receiving may comprise an electric vehicle induction coil 316 or some similar device configured to receive wireless power. The electric vehicle wireless charging system 314 further comprises a ferrite material having a first side coupled to the means for receiving. The ferrite material may comprise iron oxide with nickel, zinc, and/or manganese material or another ferrite material. The electric vehicle wireless charging system 314 also includes means for cooling the receiving means using a first heat exchanger coupled to a second side of the ferrite material. The cooling means may comprise a heat sink/heat exchanger 460, 510, 560, 610, 710, 711, and/or 810 or a similar component or device configured to cool the means for receiving.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC. For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for wirelessly receiving power, the apparatus comprising:
   a receiver circuit comprising:
   a receiver coil having a first side and configured to receive wireless power via a magnetic field generated by a wireless power transmitter, the wireless power at a level sufficient to charge or power a load of the apparatus;
   a ferrite material having a first side coupled to the first side of the receiver coil and a second side having a ferrite area; and
   a first heat exchanger coupled to the second side of the ferrite material and configured to cool the receiver coil, the first heat exchanger having an exchanger area substantially equal to the ferrite area.

2. The apparatus of claim 1, wherein the first heat exchanger is disposed within an area defined by the second side of the ferrite material.

3. The apparatus of claim 1, wherein the first heat exchanger comprises a metallic material.

4. The apparatus of claim 1, wherein the first heat exchanger comprises a cavity for guiding a flow of a cooling liquid.

5. The apparatus of claim 1, wherein the first heat exchanger comprises a plurality of metallic extensions disposed on the ferrite material substantially parallel to magnetic field lines of the magnetic field.

6. The apparatus of claim 1, further comprising a second heat exchanger thermally coupled to the first heat exchanger disposed outside an area of the receiver circuit.

7. The apparatus of claim 6, wherein the second heat exchanger comprises a metallic material.

8. The apparatus of claim 1, further comprising a second heat exchanger thermally coupled to and surrounding the first heat exchanger.

9. The apparatus of claim 1, further comprising an electronic circuit coupled to the first heat exchanger.

10. A method for wirelessly receiving power, the method comprising:
    receiving, via a receiver circuit, wireless power via a magnetic field generated by a wireless power transmitter, the wireless power at a level sufficient to charge or power a wireless power receiver, the receiver circuit comprising a receiver coil having a first side and a ferrite material having a first side coupled to the first side of the receiver coil and a second side having a ferrite area; and
    cooling the receiver circuit using a first heat exchanger coupled to the second side of the ferrite material and having an exchanger area substantially equal to the ferrite area.

11. The method of claim 10, wherein the first heat exchanger is disposed within an area defined by the second side of the ferrite material.

12. The method of claim 10, wherein the first heat exchanger comprises a metallic material.

13. The method of claim 10, wherein the first heat exchanger comprises a cavity for guiding a flow of a cooling liquid.

14. The method of claim 10, wherein the first heat exchanger comprises a plurality of metallic extensions disposed on the ferrite material substantially parallel to magnetic field lines of the magnetic field.

15. The method of claim 10, further comprising cooling the receiver circuit using a second heat exchanger thermally coupled to the first heat exchanger disposed outside an area of the receiver circuit.

16. The method of claim 15, wherein the second heat exchanger comprises a metallic material.

17. The method of claim 10, further comprising cooling the receiver circuit using a second heat exchanger thermally coupled to and surrounding the first heat exchanger.

18. The method of claim 17, wherein the second heat exchanger comprises a metallic material.

19. The method of claim 10, further comprising placing an electronic circuit coupled to the first heat exchanger.

20. An apparatus for wirelessly receiving power, the apparatus comprising:
- means for receiving wireless power from a wireless power transmitter via a magnetic field generated by a wireless power transmitter, the means for receiving having a first side and the wireless power at a level sufficient to charge or power a load of the apparatus;
- a ferrite material having a first side coupled to the first side of the means for receiving and a second side having a ferrite area; and
- first means for cooling the receiving means coupled to the second side of the ferrite material, the first means for cooling having an exchanger area substantially equal to the ferrite area.

21. The apparatus of claim 20, wherein the first means for cooling is disposed within an area defined by the second side of the ferrite material.

22. The apparatus of claim 20, wherein the first means for cooling comprises a metallic material.

23. The apparatus of claim 20, wherein the first means for cooling comprises a cavity for guiding a flow of a cooling liquid.

24. The apparatus of claim 20, wherein the means for cooling comprises a plurality of metallic extensions disposed on the ferrite material substantially parallel to magnetic field lines of the magnetic field.

25. The apparatus of claim 20, further comprising a second means for cooling thermally coupled to the first means for cooling disposed outside an area of the means for receiving.

26. The apparatus of claim 25, wherein the second means for cooling comprises a metallic material.

27. The apparatus of claim 20, further comprising a second means for cooling thermally coupled to and surrounding the first means for cooling.

28. The apparatus of claim 27, wherein the second means for cooling comprises a metallic material.

29. The apparatus of claim 20, further comprising means for controlling wireless power transfer coupled to the first means for cooling.

* * * * *